United States Patent
Krishnamurthy (10) Patent No.: US 10,277,608 B2
(45) Date of Patent: Apr. 30, 2019

(54) SYSTEM AND METHOD FOR VERIFICATION LINEAGE TRACKING OF DATA SETS

(71) Applicant: Guardtime IP Holdings Limited, Tortola (VG)

(72) Inventor: Hema Krishnamurthy, Phoenix, AZ (US)

(73) Assignee: Guardtime IP Holdings Limited, Tortola (VG)

(*) Notice: Subject to any disclaimer, the term of this patent is extended or adjusted under 35 U.S.C. 154(b) by 93 days.

(21) Appl. No.: 14/830,751

(22) Filed: Aug. 20, 2015

(65) Prior Publication Data
US 2017/0054736 A1 Feb. 23, 2017

(51) Int. Cl.
H04L 29/06 (2006.01)
G06F 21/62 (2013.01)
G06F 21/64 (2013.01)

(52) U.S. Cl.
CPC ........ H04L 63/123 (2013.01); G06F 21/6209 (2013.01); G06F 21/64 (2013.01)

(58) Field of Classification Search
CPC ....... H04L 9/3226; G06F 21/64; G06Q 20/00; G06Q 30/06
USPC .......................................................... 726/26
See application file for complete search history.

(56) References Cited

U.S. PATENT DOCUMENTS

| | | | | |
|---|---|---|---|---|
| 5,157,726 A * | 10/1992 | Merkle | ................ | G03G 15/221 380/55 |
| 5,771,292 A * | 6/1998 | Zunquan | ............... | H04L 9/3226 380/269 |
| 7,139,910 B1 * | 11/2006 | Ainsworth | ........... | G06Q 20/401 713/155 |
| 7,394,573 B1 * | 7/2008 | Goldberg | .............. | G06T 1/0042 358/1.15 |
| 8,032,542 B2 * | 10/2011 | Reynolds | ................ | G06F 21/64 707/696 |
| 8,170,929 B1 * | 5/2012 | Mallon | .................. | G06Q 30/06 705/1.1 |
| 8,307,218 B2 * | 11/2012 | Laurie | ..................... | G06F 21/64 713/175 |
| 8,812,853 B1 * | 8/2014 | Atkins | ............... | H04N 21/4788 713/176 |
| 9,286,403 B2 * | 3/2016 | Papa | ........................ | G06F 16/13 |
| 2001/0002485 A1 * | 5/2001 | Bisbee | ................... | G06Q 20/00 713/167 |
| 2001/0011350 A1 * | 8/2001 | Zabetian | ............ | G06Q 20/3821 713/176 |
| 2002/0038318 A1 * | 3/2002 | Cochran | ................. | G06F 21/64 715/205 |

(Continued)

*Primary Examiner* — Bryan F Wright
(74) *Attorney, Agent, or Firm* — Jeffrey Pearce (57) ABSTRACT

Whenever users receive or transfer a copy of any of a set of documents, prior verification of the document is enforced by an administrative system, which associates verification metadata with the copy. As each copy is itself copied and transferred, updated verification metadata is included with the previous verification metadata to form a verification lineage chain, which can later be examined to determine the circumstances of any verification failure. Documents are preferably verified by comparing the digital signature of the current copy with the signature of a reference copy. Documents may be signed by submitting them as input records to a distributed, keyless, hash tree infrastructure.

20 Claims, 7 Drawing Sheets

(56) References Cited

U.S. PATENT DOCUMENTS

| | | | |
|---|---|---|---|
| 2002/0128940 A1* | 9/2002 | Orrin | G06Q 30/06 |
| | | | 705/35 |
| 2004/0153653 A1* | 8/2004 | Abhyankar | G06F 21/6209 |
| | | | 713/179 |
| 2005/0063545 A1* | 3/2005 | Fujimoto | G06F 21/64 |
| | | | 380/277 |
| 2005/0089190 A1* | 4/2005 | Shavit | G06F 21/10 |
| | | | 382/100 |
| 2006/0271554 A1* | 11/2006 | Shaikh | G06Q 10/10 |
| 2008/0016358 A1* | 1/2008 | Filreis | H04L 63/123 |
| | | | 713/176 |
| 2009/0025092 A1* | 1/2009 | Smith | G06F 21/6245 |
| | | | 726/30 |
| 2009/0157869 A1* | 6/2009 | Cleary | G06F 16/1837 |
| | | | 709/224 |
| 2009/0234892 A1* | 9/2009 | Anglin | G06F 16/1756 |
| 2011/0080618 A1* | 4/2011 | Viswanathan | G06F 21/64 |
| | | | 358/3.28 |
| 2012/0260096 A1* | 10/2012 | Balinsky | G06F 21/6209 |
| | | | 713/176 |
| 2013/0276058 A1* | 10/2013 | Buldas | G06F 21/64 |
| | | | 726/2 |
| 2015/0007124 A1* | 1/2015 | Krasnicki | G06F 17/5036 |
| | | | 716/136 |
| 2017/0126702 A1* | 5/2017 | Krishnamurthy | H04L 63/123 |

* cited by examiner

SYSTEM AND METHOD FOR VERIFICATION LINEAGE TRACKING OF DATA SETS

TECHNICAL FIELD

This disclosure relates to systems and methods for tracking the verification history of data files.

BACKGROUND

Whenever a commercial airplane crashes, officials and the public await the discovery and analysis of the "black box" flight data recorder, which indicates the status of various flight parameters over time. Often, the failure that led to disaster happened minutes or even hours before the actual crash.

Less dramatically, assume that a bag fails to turn up at baggage claim at the airport. All the owner knows, and probably all the baggage claim agent knows, is that the bag did not arrive, with no idea initially at which of the many stages of handling from initial check-in some mistake occurred. Using the bag tag identifier (typically encoded with a bar code), the airline is usually able to determine the bag's whereabouts by tracing the identifier back through a tracking system.

As useful and sometimes necessary as such fault-detection systems may be, they generally track events (aileron failure, misrouting), but the very act of initiating an inquiry, and the circumstances of the inquiry itself, may sometimes provide information as relevant, or even more relevant, than information about individual failure events. For example, knowing that there have been a large number of recent inquiries about a person's credit history might be highly relevant to a potential lender, regardless of the results of the inquiries. In short, the "metadata" about information access may sometimes be as valuable as the information itself.

Similar issues arise in the context of data, especially in environments in which data files, such as documents, may be downloaded, copied, deleted, and altered not only directly by those initially accessing them, but also by those downstream who may have gotten them from upstream users. There are several known document-control schemes for creating and maintaining access and audit logs, such that access history is preserved for later analysis, but much of the information is stored in a linear, disjointed manner that makes patterns difficult to discern, and often fail to put the data in a context informed by metadata.

DETAILED DESCRIPTION

Broadly, embodiments of this invention involve a system and methods that implement what can be called a "data flight recorder" in the sense that verification requests for data sets are tracked in a way that allows for efficient later analysis, especially in case of a verification failure. The data sets may be of any type, and may be of different types. In the context of embodiments of the invention, merely for convenience, all such data sets are referred to as "documents". A "document" is thus any set of digital data for which a digital signature may be created as a unit, regardless of the type of data. A file containing executable code, a text document suitable for word-processing, an image file, a database record, an image of a virtual machine, data containers, etc., are all examples of the substantially unlimited number of types of "documents" that embodiments of this invention may deal with.

Figure 1:
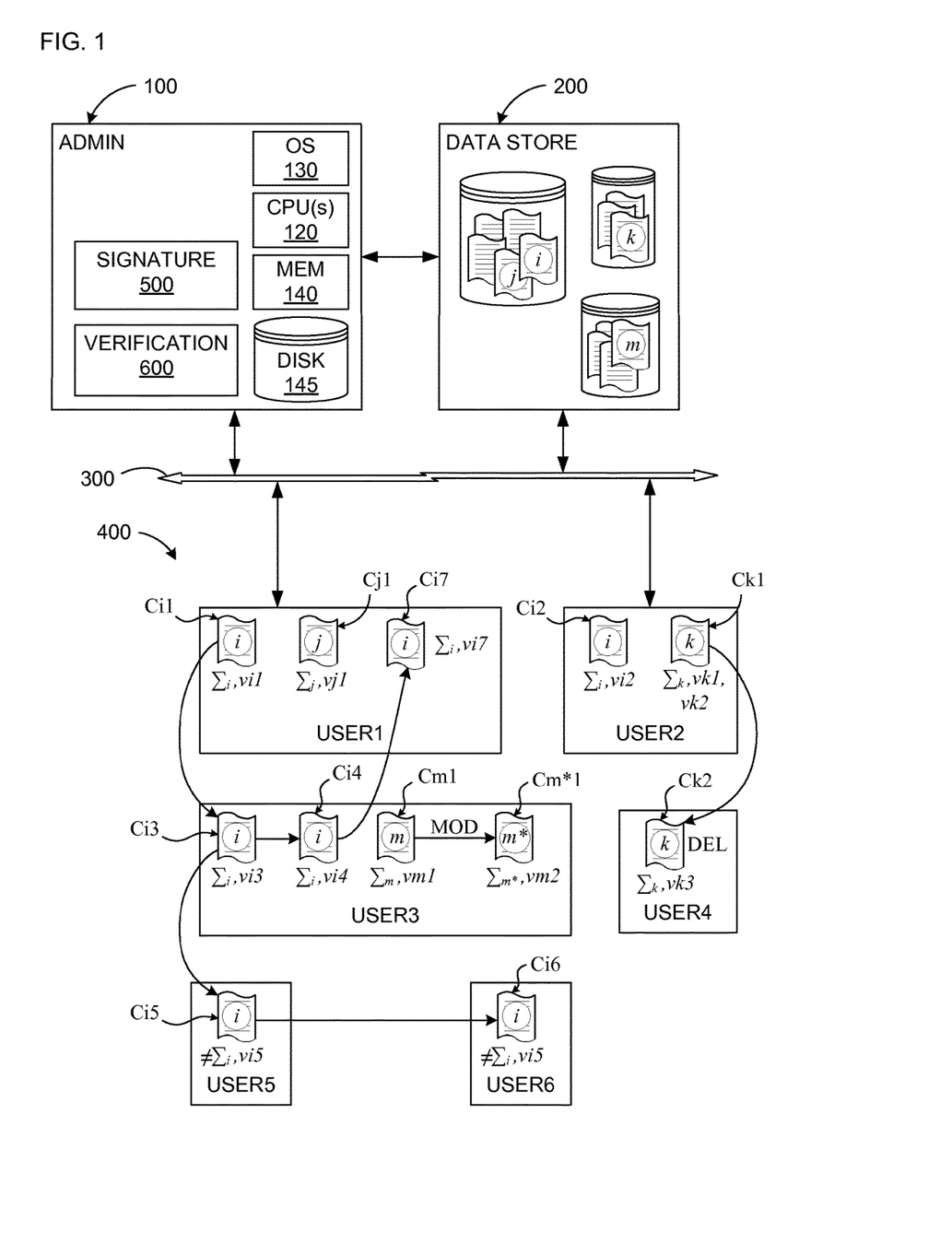
FIG. 1 illustrates the general structure of a system for verification lineage tracking of a data set.

As FIG. 1 shows, an administrative system 100 includes typical hardware and software components such as one or more processors 120, some form of system software such as an operating system 130 and some non-volatile memory 140 and/or persistent storage media 145 that store the non-transitory, processor-executable code that embodies the various software modules described below. The administrative system 100 is shown as having memory 140 separate from disk storage 145, but this is not required, especially given that many modern storage devices are implemented as solid-state, flash devices. The administrative system 100 is also shown as having a signature module 500 and a verification module 600, preferred examples of which are described below. As will become clearer, the signature module 500 could also be implemented within some other platform and need not be in the same administrative system as the verification module 600.

Documents are stored either in the administrative system 100 itself, or in some form of data store 200, which may be a single storage system, a cooperating group of storage devices, or even distributed logically and/or physically, including in remote devices in a "cloud" storage arrangement. Of course, any combination of local and/or remote storage devices may also be used to store documents. In FIG. 1, four "original" or "source" documents are marked "i", "j", "k", and "m". In actual implementations of the invention, there will typically be a much greater number of documents, which can be handled in the same manner as is described below for documents "i", "j", "k", and "m".

The administrative system 100 may communicate with the data store 200, and with other entities, such as a universe of users 400, either directly, or via one or more networks 300, which may be dedicated and proprietary, or the Internet, or any other type or combination of LAN, SAN, or other network technologies. As needed, all of the network-connected systems will also include conventional connection and data-transfer devices or circuitry, such as a network interface card.

In FIG. 1, six users 400 are shown (USER1, ..., USER6), which may be separate computers or servers in their own right, and/or may be different software or hardware entities or systems (such as virtual machines, routers, etc.) operating on a shared platform, or any combination of these options. In general, a "user" is any logically distinct entity that accesses and may process documents. Of course, each user that is a separate hardware platform will also include standard components such as one or more processors, some form of system software, and memory and/or storage devices for storing not only documents and their metadata, but also the computer-executable code used to carry out the various procedures described below. Depending on the configuration, the users will also be able to connect for data transfer with the administrative system 100 via the network(s) 300, as well as with the data store 200 and/or with each other.

A digital signature Σ is computed for each document that is to be made available to users, either in advance, or at least before any copy of the document is passed to any user. In FIG. 1, the signatures for documents "i", "j", "k", and "m" are indicated as $\Sigma_i$, $\Sigma_j$, $\Sigma_k$, and $\Sigma_m$, respectively. The signature will indicate whether the data in each document has been altered.

Although any number of users may access any number of documents, and potentially pass them on to other users in any manner, FIG. 1 illustrates the following example situation, where Cdc indicates copy number c of document d:

USER1 has downloaded from the data store 200 a copy (Ci1) of document i, as well as a copy (Cj1) of document j.

USER2 has also downloaded from the data store 200 a copy (Ci2) of document i, as well as a copy (Ck1) of document k.

USER3 has downloaded from the data store 200 a copy (Cm1) of document m, has obtained from USER1 a copy (Ci3) of document Ck1, and has internally created a copy Ci4 of Ci3.

USER3 then transferred a copy of Ci4 back to USER1, thereby creating Ci7. An example of when this might happen is that a superior may have received a document from a subordinate, reviewed it, then sent it back, unchanged and approved.

USER4 obtained from USER2 a copy (Ck2) of document Ck1, but subsequently deleted it (marked as DEL in FIG. 1).

USER5 obtained a copy of Ci3 from USER3, creating Ci5.

USER6 obtained a copy of Ci5 from USER5, creating Ci6.

Within USER1-USER4, all the documents are shown with their associated data signatures $\Sigma_i$, $\Sigma_j$, $\Sigma_k$, and $\Sigma_m$ to indicate that the signatures for each of those documents are still correct, that is, that the documents have not changed relative to their respective originals "i", "j", "k", and "m". Within USER5 and USER6, however, the documents Ci5 and Ci6 have signatures that do not match the originals, indicated as "$\neq \Sigma_i$". In other words, something has happened from the time that Ci3 was created and the time when Ci5 was created, or, depending on when signatures are checked, from the time Ci3 was transferred and Ci3 was transferred.

Now assume that, before any document may be downloaded (or opened or otherwise processed) or transferred, its signature must be verified by the administrative system, such as via the verification module 600, or by some other verifying entity that performs the same function as the verification module 600. This requirement may be enforced in any manner. For example, many documents are password-protected and many storage systems require user identification before they allow downloading of any stored files. Similar mechanisms may be built into the access procedure for documents so as to require communication with the verification module 600. In other systems, a user must request, receive, and present some form of token before being allowed to obtain or copy a stored file. Such a token-based arrangement is just one alternative method of enforcing a requirement to verify documents.

Each verification will involve some metadata. For example, a verification request, in addition to the actual data to be verified, may include information such as:

system/node ID;

identifier such as the MAC of the user's computer and/or some other identifier such as a Globally Unique Identifier (GUID) that associates the request with the requesting asset;

physical and/or logical time of the verification request;

document ID;

user ID;

ID of the entity from which the document was received, including from within the same system as an internal copy, restoration, etc.;

data indicating the result of verification (such as pass/fail);

any other information as desired by the system designer.

In the figures, the set of metadata associated with each verification request is in the form vxy, where x indicates which original document is the first "ancestor" of the respective version of the document, and y indicates the ordinal number of the verification request. Thus, vi4 indicates the verification metadata for the fourth verification request of a document originally derived from document i, vk2 indicates the verification metadata for the second verification request of a document originally derived from document k, and so forth. For succinctness, the set of information included in each set of verification metadata is referred to alternatively below as a "verification vector", inasmuch as it comprises several elements.

As FIG. 1 shows for USER2, a single user might request verification more than once for a given document; thus, vk1 and vk2 are shown as being associated with the same instance of document i, that is, Ck1. This might be, for example, because the user was working with document Ck1 in two separate sessions, and requested reverification to ensure it had not changed from session to session.

In the examples above, it is assumed that no copy of a document should differ from its "parent" copy. In other words, the signature for Cdc should be identical to the signature for Cd(c+1). This need not be necessary. Rather, assume that a user is authorized by the administrator to modify a copy of a document. This can be reflected, for example, in the token that the administrator returns to the requesting user. After any modification, the authorized user will then request a new signature for the authorized, modified copy (otherwise, downstream copies of the modified document would not verify). The authorized, modified copy of the document then becomes the reference copy (instead of the original version) for downstream copies of it, that is, the copy whose digital signature is the basis for verification of downstream copies. The new signature, preferably plus an indication of modification, should then be included in the verification metadata for all further copies in the document path, preferably along with the previous signature as well. A copy of the modified document may then, if implemented, be returned for storage in the data store 200. This possibility is shown in FIG. 1 within USER3, which is shown as having modified document m (with signature $\Sigma_m$ and vm1) to be m* (with new signature $\Sigma_{m*}$ and vm2).

In a preferred embodiment of the invention, verification vectors are "chained", that is, each new verification vector includes either all previous verification vectors in the current document's "lineage" from the original download, or some function that encodes all previous verification vectors.

Whenever a verification failure is detected, it will therefore be possible to determine not only at what point the failure occurred, but also the history of verification requests, that is, the metadata not only about the document (if this is recorded at all), but, in particular about the history of verification request and the results.

Note that constant monitoring of the state of documents, and a rapid reaction to a verification failure, may not always be practical, especially in an infrastructure in which there may be thousands or even millions of documents being passed to and between an equally large number of users. Thus, an altered document might be passed in several versions to many users before an administrator (such as one responsible for overall data integrity and security) realizes there has been a violation.

Delay in taking action in response to verification failures might also be deliberate. Checking for verification failures might, for example, happen on a schedule, such as at the end of some time period, or whenever there is a system backup, etc. In some cases, even when verification failure detection is fast, it may still not be desirable to react to every failure; rather, action may be programmed only after some number of verification failures, which might be set to different numbers depending on the nature (such as importance, security level, etc.) of the documents, or when the number of failures for a defined set of documents exceeds some threshold, when verification has failed for all or some number of documents in the set as failed, etc.

Figure 2:
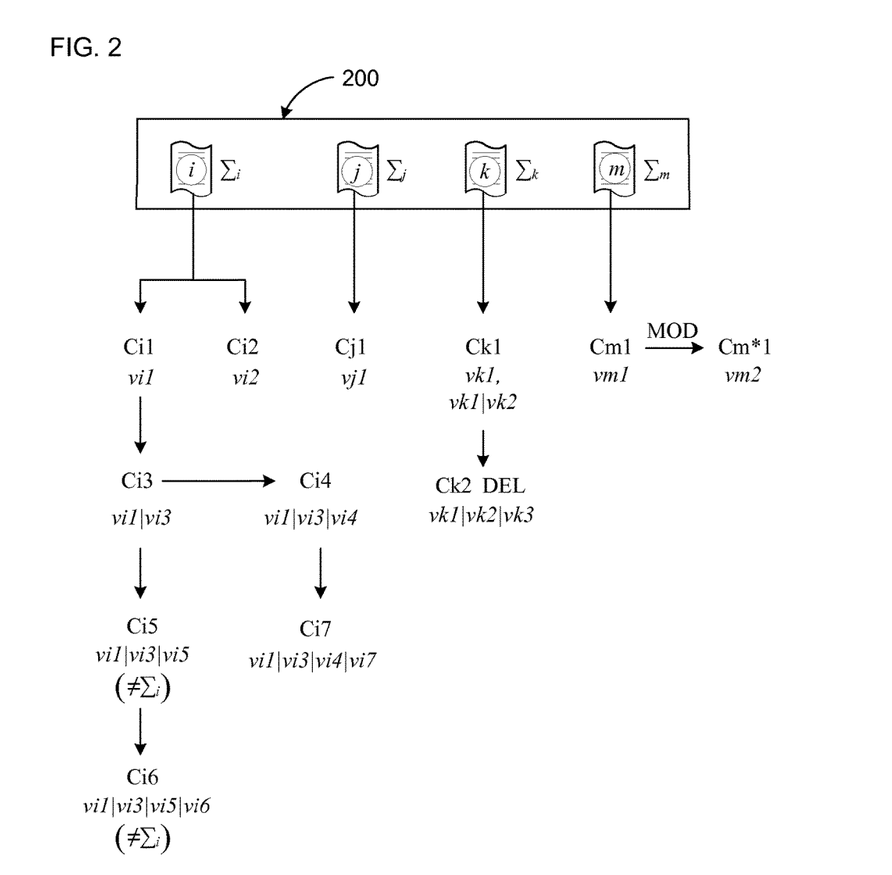
FIG. 2 illustrates a very simple verification tree that includes verification chains for four data sets.

FIG. 2 illustrates the document flow of FIG. 1 in terms of verification vectors. Thus, for example, the verification chain for Ci4 includes not only the current verification vector vi4, but also the previous verification vectors vi3 and vi1, which is indicated in the figure as vi1|vi3|vi4. (Note that vi2 is not in this chain, since it is associated with Ci2.) Similarly, the verification vector for Ci6 is vi1|vi3|vi5|vi6. By the time of Ci6, however, there have already been two verification failures ($\neq \Sigma_i$) of copies of document i. Assume that either the user, or the system administrator, then wishes to know more about the failure. Rather than having to search back through and analyze an audit log of everything that has happened over potentially millions of document actions (downloads, copies, deletions, etc.) happening within many user systems, the failure may be traced given the Ci6 verification vector alone. In this case, it can be determined that something happened in the transition from vi3 to vi5, that is, from Ci3 to Ci5. Depending on which information is included in each verification vector, the user(s), computer(s), time(s), etc., of the beginning of the failure can be determined rapidly, and whatever action the administrator prefers can be taken. For example, future verification of documents in the "faulty" chain may be denied, thereby preventing further copies or other transfers while still allowing for continuation of other "clean" chains. Alternatively, all actions for all future copies of the document could be stopped, even in "clean" chains, thereby giving an opportunity to mitigate the effects of a possible protocol or security breach.

Note that deletion of a document, such as Ck2, does not necessarily require that the corresponding verification vector vk3 be deleted as well; rather, the vector is preferably maintained in its corresponding chain for future reference if needed. Similarly, restoration of a previously deleted document may be treated as any other copy, requiring re-verification, thereby creating a new "link", that is, element, in the verification chain. That the new copy is a restored version of a deleted one may be included as a parameter in the verification vector.

The verification chain for each instance of a document may be stored along with the document itself, for example, embedded in the verification metadata as it moves through the system, along with any other typical metadata. For example, text files created using most common word-processing programs typically include metadata such as the time of document creation, modification, etc., which changes for each new version of the document, or each time the document is modified. Similarly, documents comprising code typically include such metadata as the version number, which is changed upon updates. Verification chains may also, or instead, be stored by the administrative system, either internally or in the data store 200.

There are many different uses for the verification lineage tracking made possible by this invention. Some are described above. On the "small" scale, an administrator can identify where in a document handling chain something occurred to change the document to where it can no longer be verified. On the "large" scale, verification lineage can help provide trust on a data asset moving through a data lake, that is, a typically large body of "raw" data stored in native formats until it is needed. This is sometimes referred to as "big data". In such cases, embodiments of the invention may be useful in the context of providing regulatory compliance for data residing in such a data lake. The verification metadata captured then need not be specific to any particular Extract, Transform and Load (ETL) flow, but rather may provide a tracking mechanism for all the data that flows from the source in the lake to targets/users. Regulated industries may, moreover, use the efficient, tree-based verification for audit purposes. Note that verification lineage tracking offers a certain level of trust on the data that analysts are working on at any stage in a data lake. The verification lineage method implemented by embodiments of this invention works like an "x-ray" for the data moving from the source to its destination through the data lake by capturing a rich variety of immutable metadata information that is, in the prior art, usually unavailable for inspection and analysis.

Although it is anticipated that embodiments of this invention will be primarily "after the fact", to detect where in the course of the lineage of a file that verification failed, this isn't the only use; rather, embodiments may also be used "proactively". For example, the current verification chain for a given data set, if "clean" (no failures) can be distributed along with the data set as a form of certification, that is, guarantee, to provide a level of trust for that data set before it is accepted into a user system.

As just one other example, the concept of a verification chain may also be used for data "in transit", for example, in network computing environments with multiple interconnected systems where data is shared between them. For example, systems themselves could refer to routers, computers, data sets defining containers/VM images, etc. Each entity, for example, a router, performing an operation on the data set or deploying the data set will update the lineage metadata with pertinent information, thus passing lineage information down the chain. These data sets can then be tagged as they leave the network or a designated data "boundary" or "perimeter", supervised by the administrative entity and re-verified when they re-enter the bounds of the administrator's supervision by being transferred from any physical (such as a computer) or logical location (such as a non-secured address space) outside the perimeter to one within the perimeter. If the data set fails to verify, then any remedial action may be taken, such as quarantining it for analysis, refusing to accept it for storage, etc.

In the opposite direction of data flow, the verification lineage tracking method may also be used to prevent, or, optionally, monitor and control, passage of data sets that an entity logically or physically outside a designated perimeter has requested. For example, if the identifier of the requesting users' computer is not on a white list of approved devices, or has an IP address location indicating an unauthorized, external location, or is making the request via an unapproved socket, etc., then either the administrative system could refuse the request, or could mark the metadata to indicate that the returned copy of the document has passed outside the security perimeter. Even the fact that an access request has been denied could be indicated in the verification metadata (and thus become a permanent part of the document's verification chain). Alternatively, the administrative system could alter some portion (even one bit) of the document (or an associated parameter that was used to create its signature) before sending a copy to the "outsider" user, thereby ensuring that all downstream copies of that document will also fail to verify and will forever be "tainted".

Assume that a signed data set (for example, "flat" data, or executable code with or without non-executable data, or a more complex set such as a container, which may include objects that may even include rules, etc.) is to be transmitted from one entity to one or more other downstream entities, for example, via some form of network connection device, router, etc. Any of the intermediate or final entities could then examine not only a current signature of the data set in transit, but also the associated verification chain to determine if the data set may pass to the next entity. Any verification failure could indicate a "don't pass" condition, depending on the security protocol. Note that if the data set being transferred originates from the first entity, then the verification "chain" may have only one entry when it arrives at the first downstream entity, which represents the simplest case in which the first signature verification itself may be the basis of the "pass/don't pass" determination.

Although they do not necessarily start from a single "root", the collection of verification chains may, for the sake of simplicity, be considered to form a verification "tree". In one embodiment, the entire verification tree is stored in the administrative system 100 (for example in its own storage 145), or in the data store 200 or some other storage entity so that the administrative system 100 can update it. One advantage of such a tree-like structure is that there are many well known methods for quick traversal and analysis of such structures.

Different methods may be used to create the digital signatures $\Sigma$ and to verify documents. One common signature scheme uses keys that are issued by some certificate authority. The well-known Public Key Infrastructure (PKI) is an example of such a system. One problem with key-based signature schemes is not only the need to store and maintain the key sets, but also that the keys may expire, along with the underlying digital certificates. This problem would be multiplied in environments such as the one illustrated in FIG. 1, in which there might be an enormous number of "perishable" key pairs associated with the many documents in circulation. Another disadvantage of key-based signature schemes is that they require trust of the issuing authority. Moreover, recent research indicates that some common keys may have "back doors" embedded in them, or may be generated using comprised pseudo-random number seeding routines, such that these back doors are unknown to users. Although such key-based signatures may be used in embodiments, other, more secure and flexible embodiments use a keyless system of verification for digital certificates.

In one embodiment, each document is signed by a distributed, hash tree-based signing infrastructure such as is provided by Guardtime AS of Tallinn, Estonia, which returns a digital signature that enables data verification through recomputation of a logically uppermost value in a hash tree. This infrastructure is described in more detail below. Given a purportedly authentic copy of the document, or the original, together with the data signature, an entity using the Guardtime infrastructure can then verify that the document is authentic by recomputing the uppermost hash tree value from the digital signature and the document itself (or some function of the data defining the document). The Guardtime digital signature may also automatically encode a substantially irrefutable representation of the time at which the document was originally signed.

Hash Tree-Based, Keyless Signature Infrastructure

Figure 3:
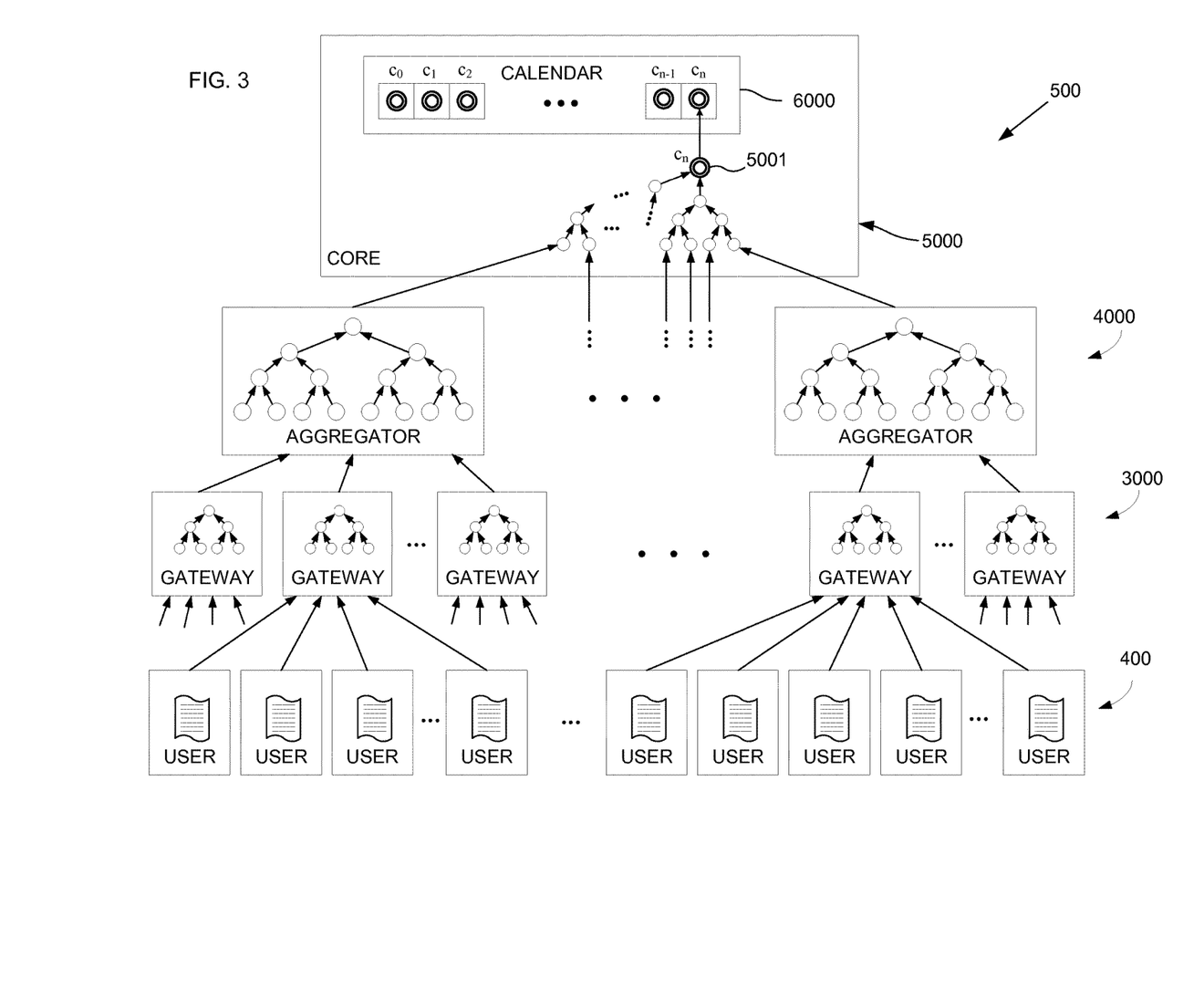
FIG. 3 illustrates various layers of a generalized digital record verification and signing infrastructure.

FIG. 3 illustrates the hash tree infrastructure (the "Guardtime signing infrastructure") that has been developed by Guardtime As of Tallinn, Estonia, and which is disclosed in U.S. Pat. Nos. 8,347,372; 8,312,528; and 7,698,557 (all Buldas, et al., "System and method for generating a digital certificate") as well as U.S. Pat. No. 8,719,576 (also Buldas, et al., "Document verification with distributed calendar infrastructure"), all of which are incorporated herein by reference. In short, the hash tree infrastructure of Bildas '576 may be used to function not only as a signature-generation system 500, but also as a timestamping system too, for any of a plurality of "clients", including the users 400. Just for the sake of completeness, the main features of the Guardtime signing infrastructure are summarized here, with reference to FIGS. 3 and 4.

Of particular note with respect to the Guardtime hash tree infrastructure is that, except for possible and optional temporary establishment of user or client ID during a session, and optionally temporarily until a time of publication (described below), it does not rely on public/private keys such as RSA in a PKI infrastructure.

The general Guardtime infrastructure has several different layers: a client or user layer comprising a number of client systems (here, including the users 400); a layer of gateways 3000; a layer including one or more aggregation systems 4000; and an uppermost layer 5000 that includes a "core". Typically, the gateways, aggregators and the core will be servers, with known network connections and network communication hardware and software.

The client systems may also be servers, but, depending on the implementation, some or all may also be more individualized workstations, laptop, personal or other mobile computing devices, etc. A client may be any system where a representation of any type of information is input, created or otherwise presented (with or without human involvement) in digital form such that it can be processed and registered using the infrastructure. In the illustrated arrangement, a client is the system where digital records are prepared and entered into the verification/signature system.

Although FIG. 3 shows the various layers as being separate and distinct, some implementations of the main principles of the infrastructure might consolidate or do without some of the layers or might need to add additional layers for administrative or other purposes. A gateway in the layer 3000 will typically be a computer system such as a server with which one or more of the clients communicates so as to receive requests for registration of digital records (such as documents) that its clients submit. An aggregator in the aggregation layer 4000 will similarly be a computer system such as a server intended to receive registration requests that have been consolidated by respective gateways. The distinction between aggregators and gateways will often depend on which entities control each, but this is not necessary and in some implementations there is no control or functional differences between the two types of systems.

Figure 4:
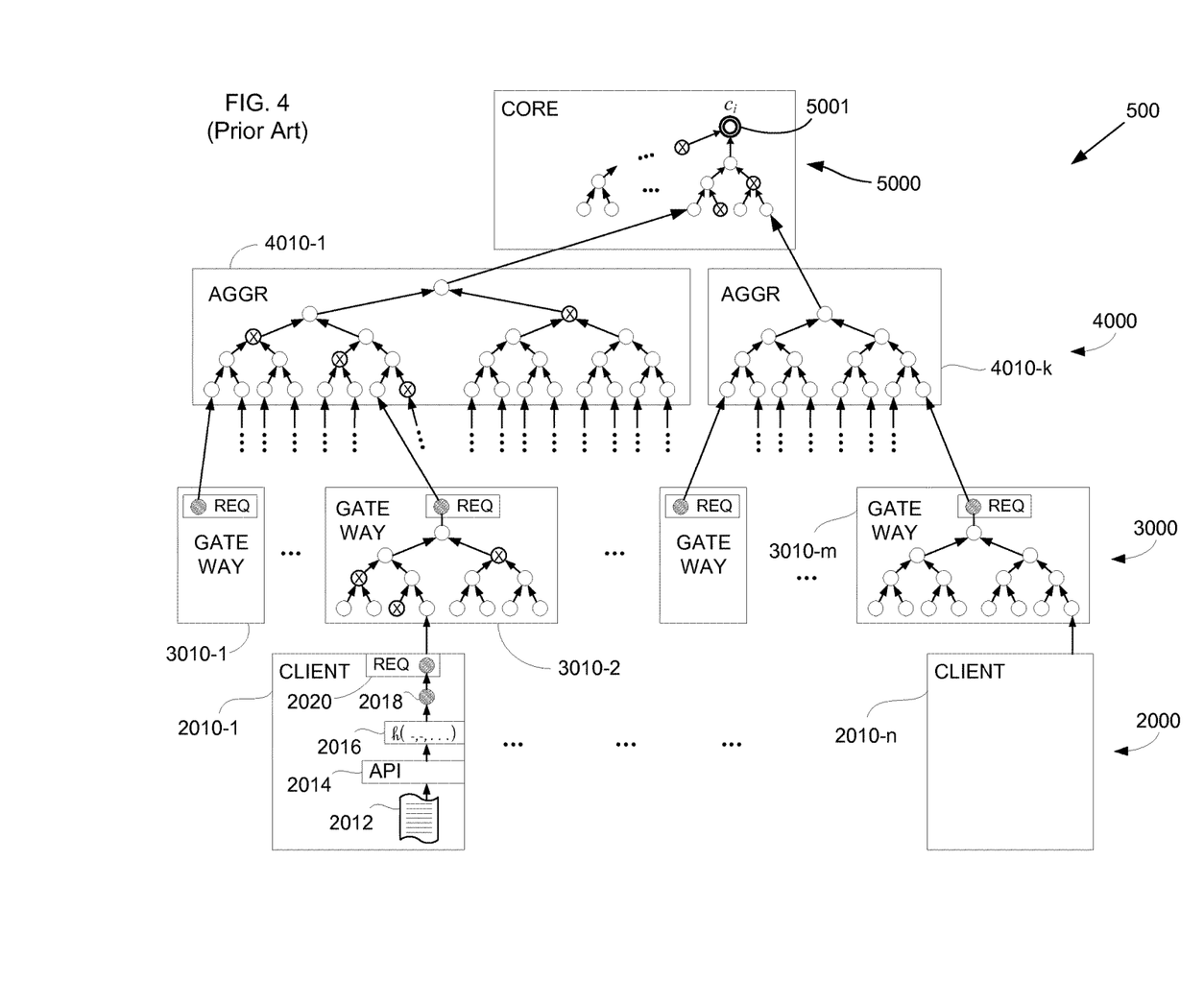
FIG. 4 illustrates the verification infrastructure along with various data and computational structures maintained and computed within different layers.

In FIG. 4, various clients are represented as 2010-1, ..., 2010-$n$; gateways are represented as 3010-1, 3010-2, ..., 3010-$m$; and two aggregators are shown as 4010-1, 4010-$k$. An aggregator will typically communicate into a respective one of the lowest level hash tree nodes within the core, as described in more detail below. Only two aggregators are shown in FIG. 4 for the sake of simplicity.

Each client system 2000 that wishes to use the verification infrastructure may be loaded with a software package or internal system routines for convenient or even automatic communication and submission "upwards" of digital information. In the context of this invention, the client system 2000 may be the one of the users USER1, ..., USER6. The software package may include some application program interface (API) 2014 that transforms submitted digital records into a proper form for processing. A digital record 2012 is then submitted by way of the API 2014 to a software module 2016 that uses the digital data from the record 2012 as at least one argument in a transformation function 2018 such as a hash function.

Note that it is not necessary (although it is possible) to submit the entire "raw" contents of a digital record for signature. Rather, the transformation may entail some form of compression such as a hash, including a cryptographic hash. This has at least two advantages. First, if a digital record, such as a document, has sensitive contents, it is not necessary to transmit them over the network and expose it to interception en route, or to reveal the contents outside of the client system itself. Second, it makes it possible to sign even large files without having to transmit such large files over the network.

The data structure of a binary hash tree is illustrated within the gateway 3010-2. The lowest level nodes of the gateway hash tree will correspond to the transformed data set 2018 submitted as a request REQ from a client/user, along with any other parameters or data used in any given implementation to form a request. As illustrated, the values represented by each pair of nodes in the data structure form inputs to a parent node, which then computes a combined output value, for example, as a hash of the two input values from its "children" nodes. Each thus combined output/hash value is then submitted "upward" as one of two inputs to a "grandparent" node, which in turn computes a combined output/hash value for these two inputs, and so on, until a single combined output/hash value is computed for the top node in the gateway.

Aggregators such as the system 4010-1 similarly include computation modules that compute combined output values for each node of a hash tree data structure. As in the gateways, the value computed for each node in the aggregator's data structure uses its two "children" nodes as inputs. Each aggregator will therefore ultimately compute an uppermost combined output value as the result of application of a hash function that includes information derived from the digital input record(s) of every client that submitted a request to a gateway in the data structure under that aggregator.

In many cases, the core 5000 is maintained and controlled by the overall system administrator. In the context of embodiments of this invention, this need not be the same as the administrative system 100. One advantage of this is that documents being verified for users will receive signatures that encode information from other, unrelated digital records as well, from completely independent sources, which then will make it in practice impossible to create fake signatures.

Within the core, a hash tree data structure is computed using the root hash values of the aggregators as lowest level inputs. In effect, the hash computations and structure within the core form an aggregation of aggregation values. The core will therefore ultimately compute a single current uppermost core hash value at the respective tree node 5001 at each of a sequence of calendar time intervals t0, t1, ..., tn. This uppermost value is referred to here alternatively as the "calendar value" $c_i$ or "current calendar value" for the time interval ti. If calendar values are computed according to precisely determined time values, such as one calendar value each 1.0 s, then each calendar value will also be a precise representation of time. In short, each digital signature issued in a given calendar interval will intrinsically and provably be tied to a particular calendar value. Due to the essentially non-invertible nature of cryptographic hash functions, this time association will be as essentially impossible to fake as the data that led to the corresponding signature itself.

Figure 6:
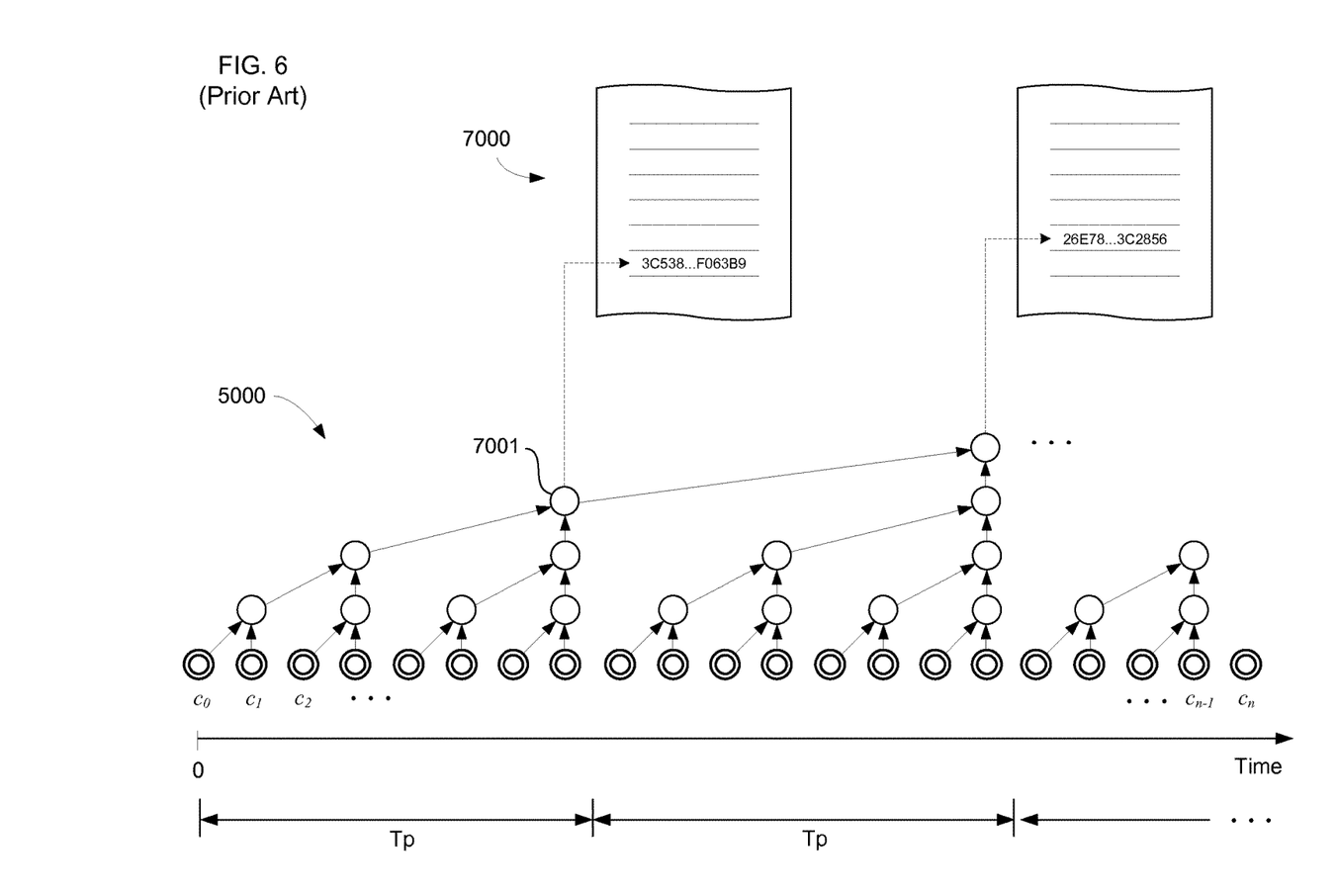
FIG. 6 illustrates optional publication to enable permanent, trust-free authentication.

Note that the uppermost tree node 5001 represents the root node of the entire tree structure of nodes junior to it. This will change upon recomputation of a new uppermost core hash value at the end of the next period of accumulating requests and generating signature vectors (also referred to as "data signatures") containing recomputation parameters. In one configuration of the Guardtime signature infrastructure, illustrated in FIG. 6, the core system 5000 combines the sequence of calendar values $c_i$ during each of a series of time intervals ("calendar periods") $T_p$ using a Merkle hash tree 7002 to form a combined uppermost hash value 7001, which will encode information from every calendar value, and thus every digital input record, ever submitted to the infrastructure for signature up to the end of the current calendar period. Periodically, the combined uppermost hash value may then be published in some substantially unalterable medium 7000, such as a newspaper, publicly accessible database or web site, some internal database or publication (such as within an enterprise or government agency), etc., such that, once the value is published, it would be practically impossible to fraudulently alter what was published; for example, it would in practice be impossible to retrieve and change every copy of a newspaper that has been distributed to the public. In many, if not most, cases, however, the level of assurance provided by recomputation to the calendar value within a signature may be adequate; indeed, in practice, the level of assurance provided by Guardtime signatures is at least as good as PKI-based systems provide, even without publication, which is thus an optional feature.

In FIG. 4, certain ones of the hash tree nodes in the gateway 3010-2, the aggregator 4010-1, and the core 5000 are marked with an "X". Notice if one traverses the various tree paths upward from the value 2018 in the client 2010-1, it is possible to compute every value upward in the tree structures all the way to the most current uppermost core value 5001 given the values in the X-marked tree nodes (the "siblings" of the nodes in the direct recomputation path) and a knowledge of the hash functions applied at each successive parent node. In short, if a signature is associated with the digital record 2012 that includes all of the "X-marked" values, and assuming predetermined hash functions, then re-computation of the hash values upward through all of the tree structures will yield the same value as in the current calendar value, but only if the starting input value representing the original digital record, plus any additional parameters that were included, is in fact identical in every respect to the original. Even the slightest alteration in the digital input record or even a change of a single bit in any of the values of the signature associated with a record 2012 will lead to a re-computed calendar value that is not identical to the one in node 5001. In short, any change, no matter how small, in a document will lead to a failure of recomputation, that is, a verification failure.

Figure 5:
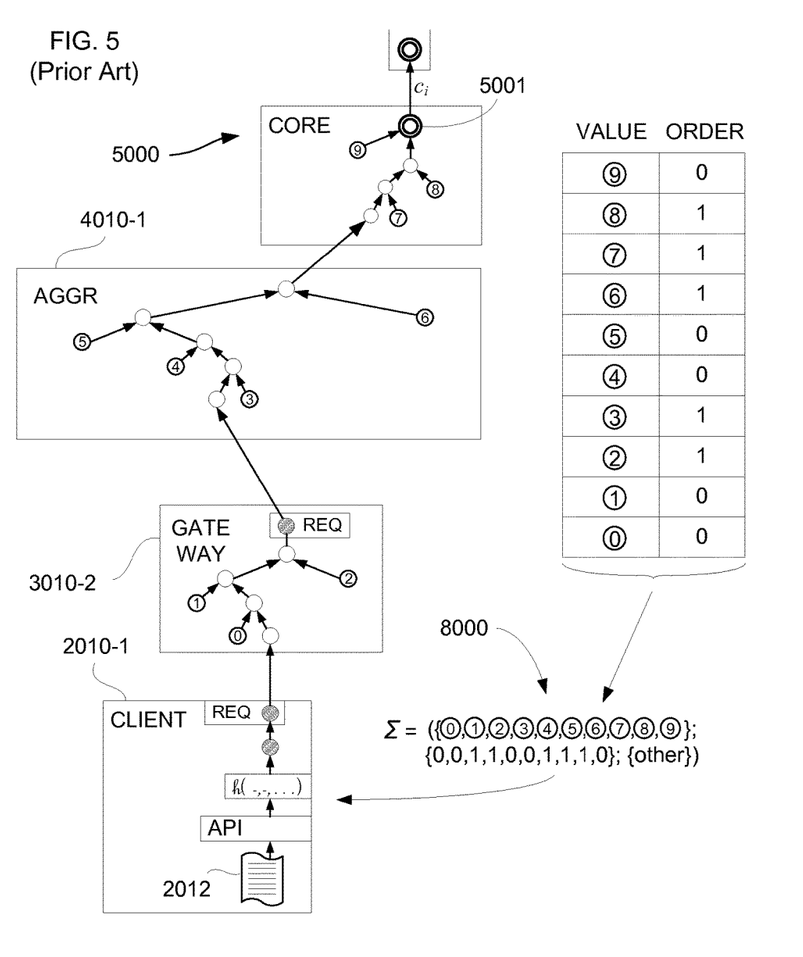
FIG. 5 shows a subset of FIG. 4 to illustrate a digital signature and recomputation of authentication values using the signature.
Figure 7:
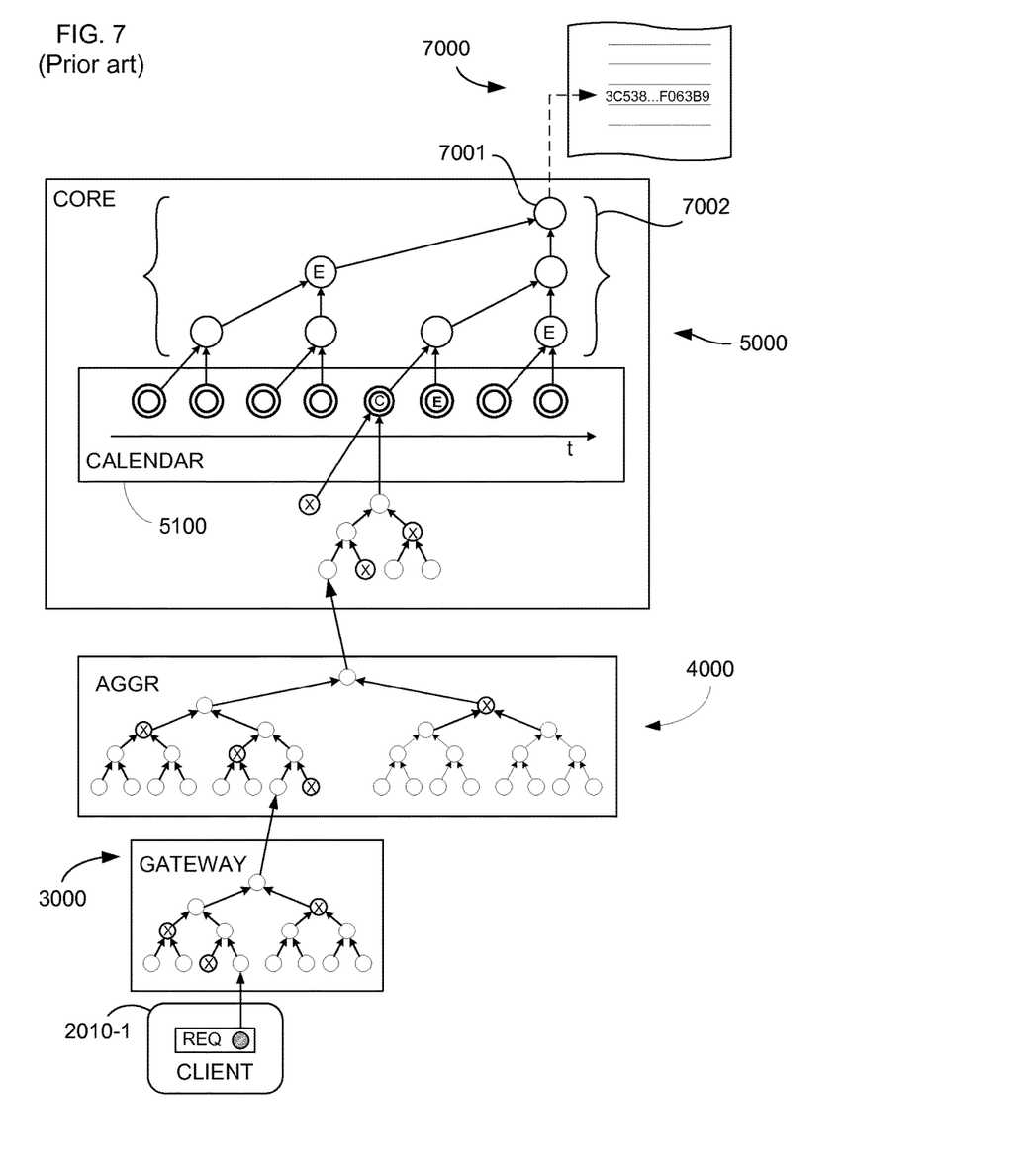
FIG. 7 illustrates use of a digital signature to enable keyless authentication by recomputation.

The set of sibling hash values, along with any other information such as order (such as "left"/"right", since most cryptographic hash functions are not commutative), that enable recomputation of the corresponding calendar value, may then be returned to the client system as the signature $\Sigma$ (8000, FIG. 5) for the digital input. If publication is implemented as an additional level of assurance, this signature may later be extended with the sibling values within the core's Merkle hash tree that allow recomputation all the way up through the infrastructure to the uppermost, published hash value 7001 of the core 5000 for the corresponding calendar period. FIG. 7 illustrates this option, in which the "X-marked" sibling values in a digital signature may be extended with the "E-marked" sibling values to enable recomputation all the way up from a client 2010-1 to the published value 7001. Note that, at that point, it will in practice be impossible to alter an input in any way without this being detectable: Even if an exceptionally sophisticated and malicious entity were to try to manipulate every value in the calendar so as to create a fake calendar value that made the fake input seem correct, then this would still not avoid detection, since the published value 7001 will in general be impossible to change as well.

Assume now by way of example that some entity later wishes to verify that a digital record in question—a "candidate digital record" or "candidate document"—is an identical copy of digital record 2012. Let Cal($\delta$) be the calendar value obtained by recomputing from digital input (document) $\delta$ up to the calendar value included in the digital signature associated with the original $\delta$. Applying the same transformation function 2016 to the candidate digital record and recomputing upward using the corresponding data signature, the entity should compute to the exact same calendar value Cal($\delta$) (or publication value 7001) that resulted from the original digital record's request.

Applying this signature solution in the context of this invention, assume that some entity purports that a document $\delta^*$ is the same as an original document $\delta$. For example, assume that USER4 submits Ck2 (applying whatever transformation and including whatever additional parameters were initially used to compute $\Sigma_k$) for verification. With Ck2 and the digital signature $\Sigma_k$, a verifier can then recompute the chain of hash values "upward" to a final, uppermost value, which should match the calendar value included in the signature. Ck2 may then be considered to be verified only if Cal(Ck2)=$\Sigma_k$.

Using the standard Guardtime infrastructure, the digital signature alone is generally sufficient to enable verification (or failure) of a document: The signature includes the "sibling" values and if the hash function used for computations is also known, recomputation is straightforward. For embodiments of this invention, however, at least the act of performing a verification should preferably be made known to the administrative system 100 (for example, the verification module 600), so that it may maintain a complete and accurate verification tree. In the preferred embodiment, the users send to the verification module 600 either the document to be verified, or its transformation, so that the verification module 600 itself performs the recomputation. This will in reduce the likelihood that a user reports successful verification when that is not true.

As an alternative, before being allowed to process a document (again, which may entail opening any kind of file), users may be required to complete a verification internally, then report the results, along with the metadata of the verification procedure, that is, the verification vector, to the administrative system 100. One apparent weakness of this arrangement is a potential malicious "false positive", that is, a malicious user might "report" successful verification even though a current document is in fact not identical to the original. This could also happen even if all verifications are done within the administrative system: A malicious user could submit a true copy of a document, but actually use a modified copy. False "negatives" might also be possible, that is, a user reports a verification failure even for a true copy. Note, however, that both of these possibilities represent anomalies that downstream users would detect, or would at least not suffer from: If one user passes a false copy to another user, then that second user would be able to detect this because his verification would fail. An analogy to this would be a baggage handler who deliberately "loses" a bag—it would still not show up at Baggage Claim regardless of his motive. Alternatively, receiving a true copy would properly lead to verification success, regardless of what the previous user may have done internally—if the bag shows up properly at Baggage Claim, the owner will typically neither know nor care that it was temporarily mishandled in transit. Analysis of a later downstream verification chain would indicate that some anomaly had happened.

In one embodiment, each time a verification vector is created, either it, or, preferably, the entire verification chain for the current copy of the document, is also signed. Two digital signatures would then be associated with each copy of each document, one for the document itself, which should be invariant, and another, which corresponds to the current state of the verification chain. Signing the verification chain would then enable detection of any attempt to "erase" evidence of a previous verification failure by changing a failure indication.

Using the Guardtime signing infrastructure as shown in FIGS. 3-7, verification can be performed without dependence on keys. Even so, the signatures themselves are created not within user systems themselves, which is more open to malicious manipulation or attack, but rather within external entities, in particular, the gateway(s), aggregator(s) and core; in short, the data signatures created by the Guardtime infrastructure are created server-side, albeit of course with client-input data record as the basis of the signature.

Assume now that either the administrative system, or some other entity, including a user wishes to examine the verification tree, or a particular chain. This could be triggered by any designed condition. For example, such an analysis could be triggered on a schedule, or at the time of a backup, or upon user request, for example, when a user receives indication of a verification failure, or any other trigger condition. The administrative system may then take any desired remedial action. Such actions might include preventing all further transfers of the "faulty" document; preventing the user computer where the first verification failed from receiving further documents until some remedial action is taken; compiling and presenting to an administrator a report of all verification failures, along with the associated verification chains; or any other action preferred by the system designer.

The various operations of getting signatures and performing (or requesting) verification will be carried out by executing corresponding code, for example, in one or more processors 120 (with corresponding processors in user systems, the various servers in the signature infrastructure, etc.), under the direction of some system software such as an operating system, which may be stored in a non-transitory, volatile and/or non-volatile computer-readable medium such as the memory/storage components 140 and 145, which may be implemented using any known storage technology or combination of technologies. The code that embodies the different embodiments of the invention may be incorporated into the administrative system and the user systems at the time of manufacture and initial software configuration, and/or it may be installed as a computer program product either then, or later.

What is claimed is:

1. A method for detecting and tracking the state of documents, each said document comprising an arbitrary data set, said method comprising:
   storing, at a storage computing system, original versions of the documents;
   transferring a copy of at least one of the documents to at least one of a plurality of users at respective computing systems, each said user being able to create and, as a sending user, directly transfer to other of the users, as at least one receiving user, additional copies of the document;
   generating, at a signature server system, a first digital signature for each of the original versions of the documents before they are transferred to any user, said first digital signature encoding a representation of content of the respective document;
   for each current copy of any of the documents transferred from the sending user directly to at least one receiving user, submitting by the receiving user a verification request to the signature server system such that the current transferred copy is verified if it is identical to a reference version of the respective document;
   upon each transfer of the copy of at least one of the documents from the sending user to each receiving user, compiling a verification vector including verification metadata, for each corresponding document, compiling and maintaining a verification chain that includes a digital representation of all verification vectors associated with all transferred copies of the document in a transfer path of all users from the original version to the current transferred copy of the respective document, and obtaining a second digital signature for the verification chain;
   including the respective first digital signature as part of the verification metadata for each of the documents transferred directly from the sending user to each receiving user;
   including the respective corresponding verification chain and its respective second digital signature as part of the direct transfer of each current copy of any of the documents transferred directly from the sending user to the at least one receiving user;
   and upon detection of a verification failure, initiating a remedial action.

2. The method of claim 1, further comprising generating the first digital signature by submitting a function of each document as a digital input record to a keyless, distributed hash tree infrastructure system, said signature including values enabling recomputation from the function of each respective document upward through the hash tree infrastructure to a root hash value at a calendar period, said root hash value being the uppermost value of successive hashing of sibling values generated from all digital input records input to the hash tree infrastructure during the calendar period.

3. The method of claim 1, in which the verification chain for each copy of each document includes an indication of whether each copy of the respective document was successfully verified, as a function of its signature, for all copies in its respective transfer path.

4. The method of claim 1, in which the remedial action is that no further copy of the corresponding document is transferred.

5. The method of claim 4, in which the remedial action is taken in an intermediate system between an originating device and a user device.

6. The method of claim 1, further comprising, within an administrative system, compiling and storing a verification tree for each document, said verification tree comprising the verification chains for all transfer paths of each document.

7. The method of claim 1, further comprising:
   receiving the verification requests in an administrative system from any of the plurality of users; and
   requiring authorization by the administrative system before any user is allowed to process copy of any document, said authorization including performing an updated verification and extending the corresponding document's verification chain with metadata of the updated verification.

8. The method of claim 7, further comprising authorizing at least one of the users to modify a copy of any of the documents, re-signing any modified copy to obtain an updated signature, and updating the corresponding verification metadata to indicate modification of downstream copies of the modified document and to include the updated signature, said authorized, modified copy thereby becoming the reference version of all subsequent copies of the document derived from the authorized, modified copy.

9. The method of claim 1, in which the original version of each document is its corresponding reference version.

10. The method of claim 1, further comprising:
    designating a data perimeter within which an administrative system supervises document flow; and
    for any copy of any of the documents passing from a location outside the perimeter to a location within the perimeter, re-verifying the copy and taking the remedial action upon re-verification failure.

11. The method of claim 1, further comprising:
    designating a data perimeter within which an administrative system supervises document flow; and
    for any copy of any of the documents passing from within the perimeter to a user located outside the perimeter, marking the corresponding verification metadata accordingly.

12. The method of claim 2, further comprising:
    designating a data perimeter within which an administrative system supervises document flow; and
    for any copy of any of the documents passing from within the perimeter to a user located outside the perimeter, altering data included in the corresponding digital input record such that verification will fail for the out-of-perimeter copy and any derivative thereof.

13. A system for detecting and tracking the state of documents, each said document comprising an arbitrary data set, said system comprising:
    a storage computing system for storing original versions of the documents;

an administrative system including a verification software module comprising computer-executable code, which, when executed by a processor within the administrative system, configures the administrative system for receiving and completing requests for copies of the documents from a plurality of users, each said user, as a sending user, being able to create and directly transfer to at least one other of the users, as receiving user, additional copies of the document;

a signature server system for obtaining a first digital signature for each of the original versions of the documents before they are transferred to any receiving user, said first digital signature encoding a representation of content of the respective document;

for each current transferred copy of any of the documents, for verifying a designated version of any of the documents by comparing the first digital signature for the designated version with the corresponding first digital signature of a reference version of the respective document;

for compiling and associating with each transferred copy of any of the documents a verification vector including verification metadata and, for each corresponding document, compiling and maintaining a verification chain that includes a representation of all verification vectors associated with all transferred copies of the document in a transfer path of all users from the original version to the current transferred copy of the respective document, and for obtaining a second digital signature for the verification chain; for including the respective first digital signature as part of the verification metadata for each of the documents transferred directly from the sending user to each receiving user;

in which the respective corresponding verification chain and its respective second digital signature is-are transferred directly from the sending user to the receiving user along with each transfer of the copy of at least one of the documents;

and upon detection of a verification failure, for initiating a remedial action.

14. The system of claim 13, in which the administrative system is configured to obtain the first digital signature by submitting a function of each document as a digital input record to a keyless, distributed hash tree infrastructure system, said signature including values enabling recomputation from the function of each respective document upward through the hash tree infrastructure to a root hash value at a calendar period, said root hash value being the uppermost value of successive hashing of sibling values generated from all digital input records input to the hash tree infrastructure during the calendar period.

15. The system of claim 13, in which the verification chain for each copy of each document includes an indication of whether each copy of the respective document was successfully verified, as a function of its signature, for all copies in its respective transfer path.

16. The system of claim 13, in which the remedial action is that no copies of the corresponding document, for which verification has failed, are transferred.

17. The system of claim 16, in which the remedial action is taken in an intermediate system between an originating device and a user device.

18. The system of claim 13, in which the administrative system is configured to compile and store a verification tree for each document, said verification tree comprising the verification chains for all transfer paths of each document.

19. The system of claim 13, in which the administrative system is configured to authorize, and to require authorization, before any user is able to process a copy of any document, said authorization including performing an updated verification and extending the corresponding document's verification chain with metadata of the updated verification.

20. The system of claim 19, in which the administrative system is configured to authorize at least one of the users to modify a copy of any of the documents, to re-sign any modified copy to obtain an updated signature, and to update the corresponding verification metadata to indicate modification of downstream copies of the modified document and to include the updated signature.

* * * * *